United States Patent [19]
Preschutti

[11] Patent Number: 4,835,494
[45] Date of Patent: May 30, 1989

[54] AUTOMATIC LEVEL CONTROL SYSTEM FOR BROADBAND CABLE SYSTEMS

[75] Inventor: Joseph P. Preschutti, State College, Pa.

[73] Assignee: AMP Incorporated, Harrisburg, Pa.

[21] Appl. No.: 183,814

[22] Filed: Apr. 20, 1988

[51] Int. Cl.⁴ .............................................. H03H 11/06
[52] U.S. Cl. ........................................ 333/16; 379/398
[58] Field of Search .................. 333/16, 17 R, 18; 330/52; 379/398; 178/63 R, 63 E, 69 A; 375/13, 36, 12, 11

[56] References Cited

U.S. PATENT DOCUMENTS

| | | |
|---|---|---|
| 4,061,970 | 12/1977 | Magneron . |
| 4,201,959 | 5/1980 | Niiro et al. ........................ 333/16 |
| 4,208,640 | 6/1980 | van der Meijs ..................... 333/18 |
| 4,488,126 | 12/1984 | Suthers . |
| 4,583,235 | 4/1986 | Domer et al. . |
| 4,637,064 | 1/1987 | Roberts et al. . |
| 4,650,930 | 3/1987 | Hogeboom et al. . |
| 4,689,805 | 8/1987 | Pyhalammi et al. . |

Primary Examiner—Paul Gensler
Attorney, Agent, or Firm—Gerald K. Kita

[57] ABSTRACT

A device including automatic gain control for balancing losses in a coaxial transmission path of a network is disclosed. The device includes a fixed gain bidirectional amplifier, an equalizer circuit for equalizing the loss of a fixed amount of cable a circuit for providing a variable amount of loss for simulating a variable amount of coaxial cable, and a closed loop system for monitoring the signal strength of an outbound pilot signal. The closed loop system provides for adjustment of the variable simulator circuit so that the sum of the losses provided by the coaxial transmission path, the equalizer circuit and the variable simulator circuit are equal in amplitude to the gain of the fixed gain amplifier across the entire inbound and outbound bandwidth of the network.

11 Claims, 5 Drawing Sheets

AUTOMATIC LEVEL CONTROL SYSTEM FOR BROADBAND CABLE SYSTEMS

RELATED APPLICATION

U.S. patent application Ser. No. 116,481 entitled "Broadband Local Area Network" and filed on Nov. 2, 1987 for Joseph Paul Preschutti contains subject matter related to the subject matter of the present application. This related application is incorporated herein by reference.

FIELD OF THE INVENTION

The present invention relates to an automatic gain control (AGC) system for a broadband local area network (LAN) and, more particularly, to a coaxial broadband local area network automatic control system that is easy to design, install and use.

BACKGROUND OF THE INVENTION

In a conventional broadband local area network configuration a plurality of bidirectional amplifiers, coaxial cables, and splitters ar serially connected together to form a bidirectional rf signal path for outbound as well as inbound signal transportation. A typical conventional broadband LAN includes a plurality of such bidirectional rf signal paths. The network is designed to provide a specified path loss to each amplifier contained therein. Thus, if an outbound rf signal is connected to the network at the headend, the outbound signal will appear at each particular amplifier at a predetermined rf signal power level. Furthermore, the network is also designed to provide a specified path loss for rf signals connected to the network at the network extremities so that such inbound rf signals will appear at the amplifiers at predetermined rf signal power levels.

Temperature variations will cause the attenuation of the coaxial cable to change. This, in turn, will cause the rf signal power levels to change at the inputs to the amplifiers in the system. The effect of temperature caused variations in path loss is corrected in conventional broadband CATV type LANs by the addition of AGC circuits internal to the inbound and outbound amplifier sections of the bidirectional amplifiers in the system.

An AGC circuit comprises a closed-loop control mechanism that monitors an rf signal power level at the output of an amplifier and controls a variable attenuator so that the gain of the amplifier will automatically adjust to provide a constant rf signal power at the output of the amplifier, given a limited amount of rf signal variation at the input of the amplifier.

Conventional CATV LANs also require pilot signal generators. An outbound pilot signal generator is located at the headend of the network. This outbound pilot signal generator provides an rf signal at a certain predetermined frequency and power level that is connected at the headend and is distributed throughout the network to all outbound amplifiers. This pilot signal is monitored by the closed-loop AGC circuits and provides a measure of the path loss of the outbound signal path. Inbound paths also require pilot signal generators. The inbound pilot signal generators are located at the extremities of the network and provide an rf signal at a certain predetermined frequency and power level. Each inbound pilot signal is monitored by the closed-loop AGC circuits of only those inbound amplifiers serially connected between the injection point and the headend. Therefore, quite often it is necessary to have a plurality of inbound pilot signal generators in order to operate the entire inbound system with AGC.

Conventional CATV broadband LANs requiring multiple inbound pilot signal generators are configured in two basic types. The first utilizes multiple pilot signal generators operating at the same pilot frequency. The second utilizes multiple pilot signal generators operating at different frequencies.

Networks using multiple inbound pilot signal generators operating at the same frequency require the use of rf signal traps at intersections of the network where two inbound pilot signals combine. These traps are narrow-band filters that provide a significant amount of attenuation to the pilot signal of one path so that the power level of the combined path at the pilot frequency is dominated by the power level of the untrapped pilot signal.

Multiple inbound pilot signal generators operating at different preselected frequencies do not require traps but do require frequency specific AGC circuitry for the amplifiers that are controlled by that particular frequency.

Problems with conventional CATV AGC equipment and architecture include a high degree of complexity in equipment design and manufacture, increased costs, and a high degree of complexity in network design, installation and use.

The increased degree of complexity in equipment design and manufacture includes the need to provide separate variable attenuator circuits in the inbound and outbound sections of the bidirectional amplifiers used in the system, and the need to design and manufacture inbound pilot signal generators.

The increased degree of complexity in network design includes the necessity to analyze the architecture of the system, select inbound pilot system type, either single frequency operation with traps, or multiple frequency operation with different inbound amplifier AGC circuits for each frequency specified.

The increased degree of complexity in installation includes the necessity to install inbound pilot frequency generators at the system extremities, and either the installation of traps for systems specifying a single inbound pilot frequency, or the installation of different types of inbound AGC circuits in systems specifying multiple inbound pilot frequencies. In addition, once the equipment has been installed, it is necessary to adjust the inbound pilot signal generators to the proper output level and then proceed to adjust all inbound AGC circuits to provide proper operation of the system.

The increased degree of complexity in use of a conventional LAN system includes the need for routine maintenance of the inbound pilot signal generators and the inbound AGC circuits. In addition, in systems utilizing only one inbound pilot frequency with traps, the pilot signal that is trapped cannot be monitored at the headend. Therefore AGC problems in that portion of the inbound system comprising the equipment operating from the trapped pilot cannot easily be determined at the headend.

Accordingly, it is the object of the invention to provide LANs having automatic gain control that are easier to design, manufacture, install and maintain than prior art LANs. More particularly, it is an object of the present invention to provide a LAN which requires no inbound pilot signals, no inbound pilot signal generators, no inbound automatic gain control circuits and no traps. It is a further object of the present invention to provide a LAN which achieves automatic gain control in both the inbound and outbound directions through use of an outbound pilot signal only and outbound automatic gain control circuitry.

SUMMARY OF THE INVENTION

Automatic gain control is achieved in accordance with the present invention through use of a fixed-gain, fixed-loss bidirectional broadband amplification system. In the fixed-gain, fixed-loss amplification system, each node of the network includes a fixed cable equalizer, a variable cable simulator and a fixed gain bidirectional amplifier. The fixed cable equalizer circuit equalizes the loss of a fixed amount of coaxial cable. The variable cable simulator simulates the loss of a variable amount of coaxial cable. The variable cable simulator is adjusted depending upon the amount of coaxial cable preceding the node so that the attenuation of the actual amount of coaxial and the attenuation of the simulated coaxial cable (provided by the cable simulator) is equalized by the cable equalizer to provide a fixed amount of attenuation or loss across the entire bandwidth (inbound and outbound) of the network. More particularly, the variable cable simulator may be adjusted so that the fixed amount of attenuation is equal in magnitude to the gain of the fixed-gain amplifier. Thus, for an outbound signal, the signal strength is the same at the input of the coaxial cable preceding the node and at the output of the outbound amplifier of the bidirectional amplifier.

The fixed-gain, fixed-loss method of amplification allows simultaneous adjustments of both inbound and outbound path loss with a single element, the variable cable simulator. Such a fixed-gain, fixed-loss bidirectional broadband and amplification system provides for a network that is easy to design, install and maintain. The fixed-gain, fixed-loss amplification system is described in more detail in the above-identified patent application.

The fixed-gain, fixed-loss amplification system can be modified in accordance with the present invention to include the use of a pilot generator at the headend of the network and a single closed-loop AGC circuit associated with the outbound amplifier within the bidirectional amplifier at each node. This AGC circuit monitors the rf signal power of the outbound pilot at the outbound amplifier output and controls the attenuation value of the variable cable simulator.

Coaxial cable attenuation varies with frequency. Higher frequencies have more attenuation than lower frequencies. The effect of temperature on coaxial cable attenuation is to proportionally change the attenuation in a manner that changes high frequency attenuation and lower frequency attenuation by approximately the same percentage value. Increased temperature results in higher coaxial cable attenuation while lower temperature results in lower coaxial cable attenuation. In effect, then, temperature caused variations in attenuation of the coaxial cable approximate the attenuation of either a shorter or longer length of coaxial cable at room temperature.

If the variable cable simulator adjustment in the fixed-gain, fixed-loss system is controlled by the AGC circuit, then the system can automatically provide for correct path loss corresponding to the requirements associated with the attenuation of the originally installed coaxial cable loss but also to compensate for temperature caused variations in coaxial cable loss across the entire frequency band of interest. More particularly, when there is a change in the attenuation of the coaxial cable leading to a node, for example, to a change in temperature, then the cable simulator is adjusted to simulate a different amount of coaxial cable so that the attenuation provided by the actual coaxial cable when combined with the simulated coaxial cable is equalized by the fixed cable equalizer circuit to provide the appropriate amount of fixed attenuation across the entire bandwidth of the network. Thus, because the fixed-gain, fixed-loss amplification system is operative over the entire bandwidth of the network, the AGC will be correcting not only for the outbound path loss change due to changes in coaxial cable loss but will also be simultaneously correcting for the inbound path loss change due to changes in coaxial cable loss.

An additional feature of this AGC system is that a broadband LAN can be configured that requires absolutely no adjustments by the user. A major benefit of the fixed-gain, fixed-loss amplification system is that instead of separately balancing outbound and inbound systems requiring up to eight total adjustments of separate items (as in conventional LAN networks) only one adjustment to simultaneously balance inbound and outbound path losses is needed. The addition of an AGC system to the broadband LAN utilizing the fixed-gain, fixed-loss amplification system further simplifies the installation by totally eliminating adjustments by the user.

Thus, the inventive AGC system is easier to manufacture because no inbound pilot signal generators, inbound pilot traps, or separate inbound AGC circuits have to be included in the equipment.

The inventive AGC system is easier to design because it requires on analysis of architecture and selection of separate systems or components for automatic control of inbound path loss.

The inventive AGC system is easier to install because fewer components need to be installed and adjustments are completely eliminated from the system.

The inventive AGC system is easier to use because fewer components are required resulting in easier maintenance and because no adjustments are required.

DETAILED DESCRIPTION OF THE INVENTION

Before discussing the local area network AGC system of the present invention in detail, it may be helpful to briefly review a conventional prior art LAN AGC system. Such a prior art network AGC system is illustrated in FIG. 1.

Figure 1:
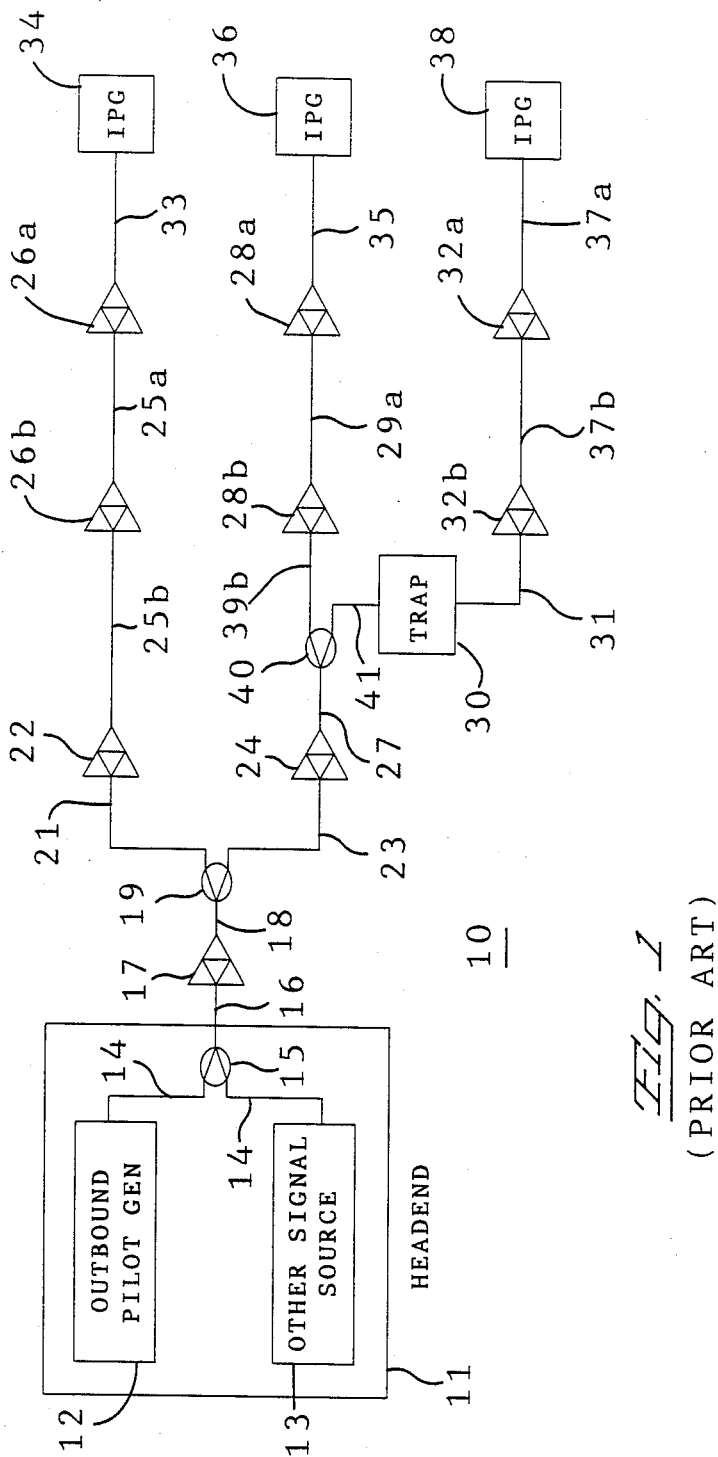
FIG. 1 schematically illustrates a conventional prior art local area network.

The network 10 of FIG. 1 comprises a headend 11 that includes an outbound pilot signal generator 12 and other signal sources 13 that are transmitted via cables 14 to combiner 15. Combiner 15 is connected through cable 16 to the first bidirectional amplifier 17 in the network. A bidirectional amplifier includes an inbound amplifier and an outbound amplifier.

Illustratively, the remaining portion of the network has been subdivided into three distinct classes of inbound system requirements. The description of these portions is easier to understand if the network is described from the outermost portion leading back towards the headend 11.

The first class of inbound system is controlled by Input Pilot Generator (IPG) 34, that generates an rf signal at frequency F34 for use as a pilot tone by inbound amplifiers between IPG 34 and the headend 11. The rf signal generated by IPG 34 is connected to cable 33, to bidirectional amplifier 26a, to cable 25a, to bidirectional amplifier 26b, to cable 25b, to bidirectional amplifier 22, through cable 21, through splitter 19 through cable 18, to the first bidirectional amplifier 17. Therefore, inbound amplifiers in bidirectional amplifiers 17, 22, and 26a,b are controlled by monitoring the rf signal strength at frequency F34 that is generated by IPG 34.

The second class of inbound system is controlled by IPG 36, that generates an rf signal at frequency F36 different from F34. IPG 36 controls all those inbound amplifiers between IPG 36 and the headend 11 that are not already specified as being controlled by IPG 34. The rf signal generated by IPG 36 is connected to cable 35, to amplifier 28a, to cable 29a, to amplifier 28b, to cable 39b, to splitter 40, to cable 27, to amplifier 24, to cable 23, to splitter 19, to cable 18, to amplifier 17. Therefore, inbound amplifiers in bidirectional amplifiers 24 and 28a and 28b are controlled by monitoring the rf signal strength at frequency F36 that is generated by IPG 36.

The third class of inbound system is controlled by IPG 38, that generates an rf signal on a frequency F36 that is identical to the frequency F36 generated by IPG 36. IPG 38 controls all those inbound amplifiers between IPG 38 and the headend 11 that are not already specified as being controlled by IPG 34 or IPG 36. The rf signal generated by IPG 38 is connected through cable 37a, to amplifier 32a, to cable 37b, to amplifier 32b, to cable 31, to trap 30, to cable 41, to splitter 40, to cable 27, to amplifier 24 to cable 23, to splitter 19, to cable 18, to amplifier 17.

Trap 30 is required to effectively decrease the energy of the rf signal at F36 generated by IPG 38 because amplifier 24 is monitoring that frequency for the rf signal being generated by IPG 36. Without trap 30, there would be interference at the inbound amplifier 24, which would be required to monitor the energy of the rf signals being generated by both IPG 36 and IPG 38, which occupy the same frequency. By trapping the signal from IPG 38 (reducing the energy substantially) the inbound amplifier 24 would be predominantly controlled by the energy of the signal generated by IPG 36.

Figure 2:
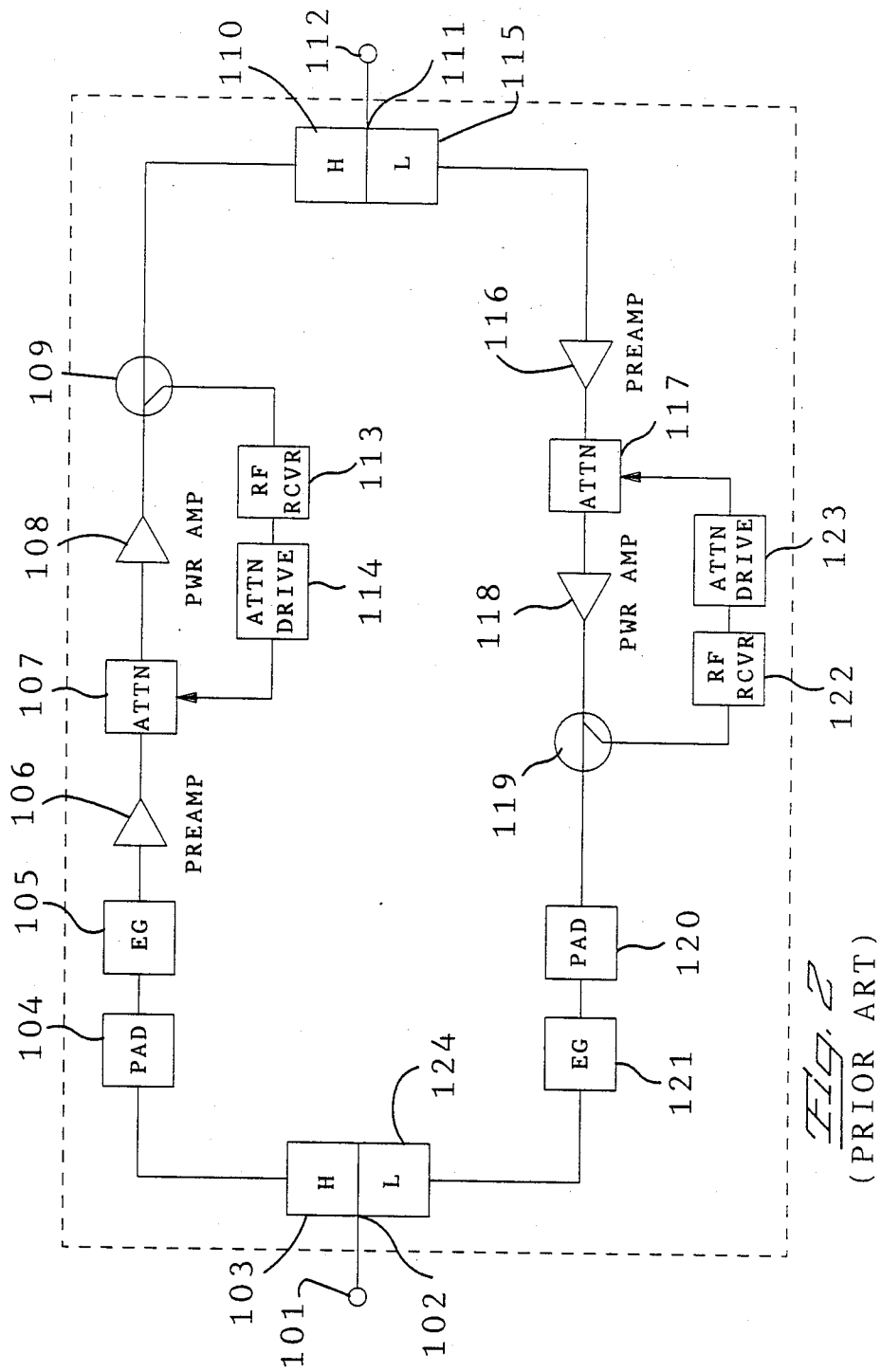
FIG. 2 schematically illustrates a conventional prior art bidirectional amplifier with AGC.

FIG. 2 is a block diagram of a conventional bidirectional amplifier with Automatic Gain Control (AGC) in both outbound and inbound amplifiers. The bidirectional amplifier 100 has an input port 101 connected to a band splitting diplex filter 102.

An outbound signal connected to input port 101 passes through the high pass filter section 103 of the filter 102 and is connected to the pad 104, which is a variable attenuator with a flat attenuation versus frequency characteristic, and equalizer 105, which has a sloped attenuation versus frequency characteristic and which equalizes coaxial cable. The signal then passes through preamplifier 106 and is connected to variable attenuator 107, which is controlled by attenuator drive circuit 114. After being attenuated by variable attenuator 107, the signal is connected to power amplifier 108, the output of which is connected to directional coupler 109. The low loss path of directional coupler 109 is connected to the high pass filter section 110 of output band splitting filter 111 and then connected to output 112.

A closed-loop control system is formed by the variable attenuator 107, power amplifier 108, the high loss path of directional coupler 109, receiver 113, and attenuator drive circuit 114. RF receiver 113 selectively tunes to the pilot signal being used by the outbound system, that is, the signal generated by outbound pilot signal generator 12 in FIG. 1. RF receiver 113 converts the energy of the pilot tone to a DC signal that is proportional to the energy at the pilot frequency. Attenuator drive circuit 114 compares the DC signal received by the rf receiver 113 to a preset reference and accordingly changes the drive to variable attenuator 107 in such a manner that the rf signal level at the output of the power amplifier 108 is maintained relatively constant within the error of the closed loop system accuracy.

An inbound signal connected to output port 112 passes through the low pass filter section 115 of diplex filter 111 and is connected to preamplifier 116 and to variable attenuator 117, which is controlled by attenuator drive circuit 123. After being attenuated by variable attenuator 117, the signal is connected to power amplifier 118, the output of which is connected to directional coupler 119. The low loss path of directional coupler 119 is connected to the pad 120, which is a variable attenuator with a flat attenuation versus frequency characteristic, and equalizer 121, which has a sloped attenuation versus frequency characteristic and which equalizes coaxial cable. The signal then passes through the low pass filter section 124 of input band splitting filter 102 and is then connected to input 101.

A closed-loop control system is formed by the variable attenuator 117, power amplifier 118, the high loss path of directional coupler 119, rf receiver 122, and attenuator drive circuit 123. RF receiver 122 is selectively tuned to the pilot signal being used by the inbound system, that is, the signal generated by any of the inbound pilot signal generators in FIG. 1, depending upon location in the network. RF receiver 122 converts the energy of the pilot signal to a DC signal that is proportional to the energy at the pilot frequency. Attenuator drive circuit 123 compares the DC signal received by the rf receiver 122 to a preset reference and accordingly changes the drive to variable attenuator 117 in such a manner that the rf signal level at the output of the power amplifier 118 is maintained relatively constant within the error of the closed loop system accuracy.

The conventional LAN shown in FIG. 1 which utilizes the bidirectional amplifier of FIG. 2 is complex to design, install and maintain.

Designing the network requires examination of the architecture to determine the nature of the inbound path structure, the location of inbound pilot signal generators, the type of inbound pilot signal generators, whether traps will be required, and the specification of the frequency for each of the rf receiver sections of the inbound closed loop AGC system in each of the bidirectional amplifiers across the entire inbound and outbound bandwidth of the network.

Installing the conventional LAN requires installation of inbound pilot signal generators and traps as well as installation of the proper bidirectional amplifier at each location. For example, bidirectional amplifiers 28a,b and 32a,b in FIG. 1 utilize inbound AGC RF receivers which operate at a frequency different from the operating frequency of the inbound AGC RF receivers in the amplifiers 17, 22, and 26a,b.

Maintenance of the conventional LAN requires maintenance of the inbound pilot generators as well as providing spare equipment for different types of inbound pilot generators, inbound pilot traps, and different types of bidirectional amplifiers.

Figure 3:
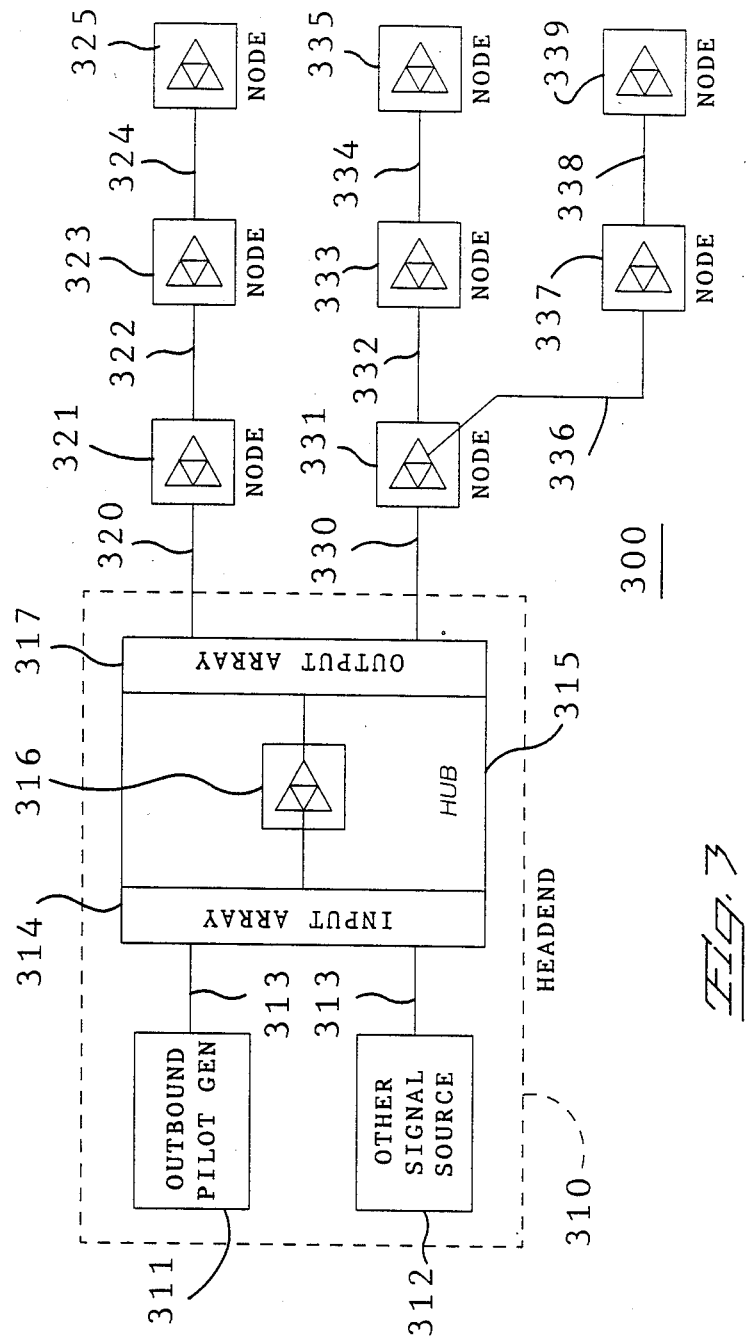
FIG. 3 schematically illustrates a LAN in accordance with an illustrative embodiment of the present invention.

A LAN 300 of the present invention is shown in FIG. 3. The LAN 300 utilizes the fixed-gain, fixed-loss amplification system. The LAN 300 comprises a headend 310 which has an outbound pilot signal generator 311 and other signal sources 312 connected through cables 313 to the input array 314 of a hub 315. Hub 315 comprises an input array 314, a bidirectional amplifier 316 and an output array 317.

Referring to FIG. 3, a signal generated by the outbound pilot generator 311 passes through cable 313, input array 314, and bidirectional amplifier 316 to the output array 317. One of the outputs of the output array 317 is connected to cable 320, to node 321, to cable 322, to node 323, to cable 324, to node 325.

The signal generated by the outbound pilot generator 311 also is connected to cable 330 from the output array 317. The signal then passes through to node 331. Node 331 is shown with two outputs capable of connecting to other nodes. One of the outputs of node 331 provides the signal to cable 332 through which node 333, cable 334 and node 335 get the signal. The other output of node 331 provides the signal to cables 336 and 338 and nodes 337 and 339.

As compared to the network 10 of FIG. 1, in the network 300 of FIG. 3 there are no inbound pilot signal generators, no traps, and all the node amplifiers in the system are identical regarding the nature of the inbound AGC system, i.e. there is no inbound AGC system. This is possible because the fixed-gain, fixed-loss method of amplification, when provided with automatic gain control in accordance with the present invention, uses only an outbound pilot signal to sense the changes in coaxial cable attenuation. A closed loop AGC system is then used to control attenuation changes across the entire frequency band of the network to correct the path losses in both outbound and inbound directions simultaneously.

Figure 4:
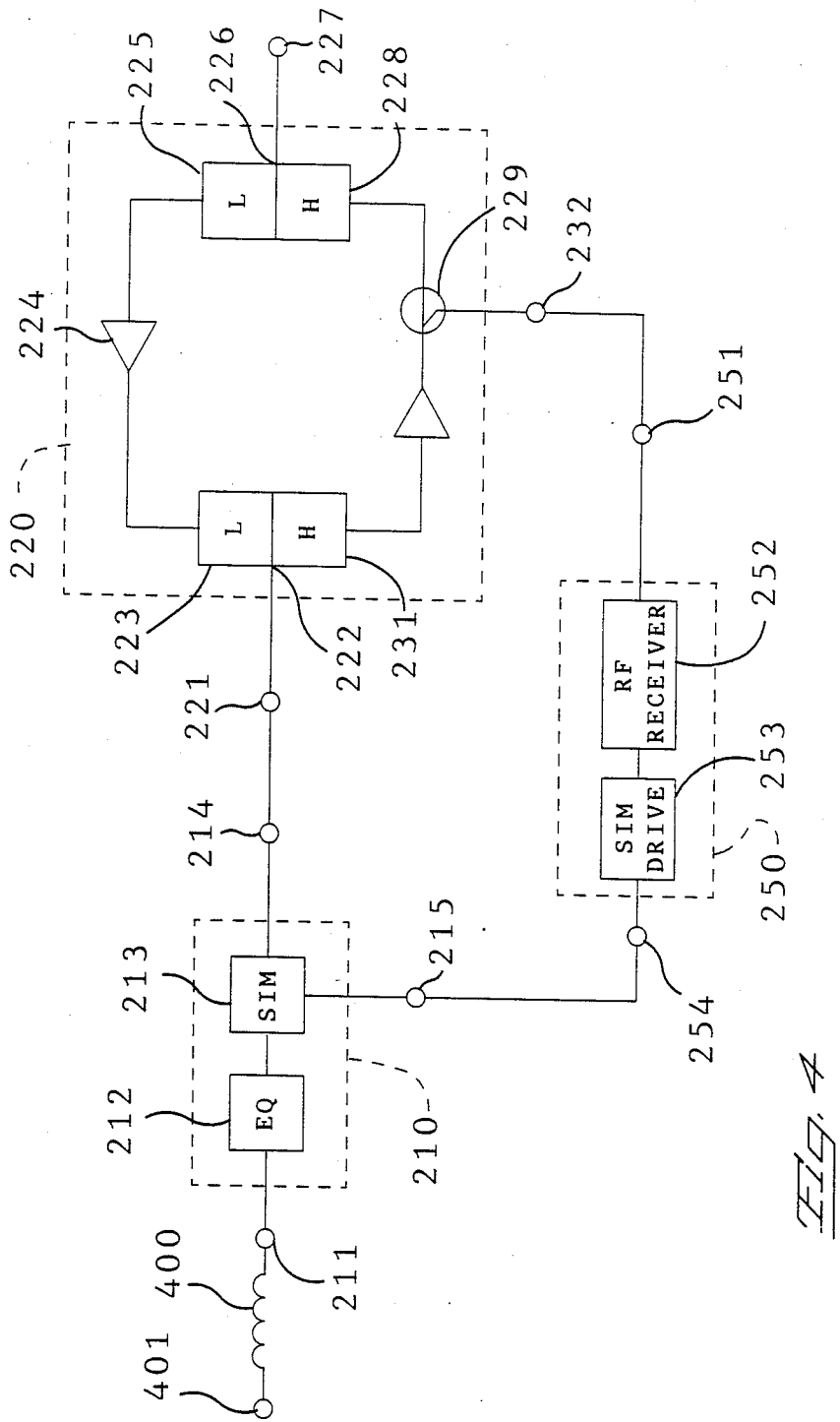
FIG. 4 schematically illustrates a fixed-gain, fixed-loss bidirectional amplifier with AGC in accordance with an illustrative embodiment of the present invention.

FIG. 4 shows how one of the nodes in FIG. 3 utilizes the fixed-loss, fixed-gain amplification system along with automatic gain control (AGC). As shown in FIG. 4, the fixed-loss, fixed-gain bidirectional amplifier 200 with AGC comprises a line balancer 210, a fixed-gain bidirectional amplifier 220 and a closed loop AGC circuit 250. The fixed-gain, fixed-loss bidirectional amplifier 200 comprises an input port 211 and an output port 227. The fixed-gain, fixed-loss bidirectional amplifier 200 forms part of each of the nodes of FIG. 3. Outbound signals generated at the headend 310 of FIG. 3 arrive at the input port 211 via coaxial cable 400 and are connected to fixed equalizer 212 and variable cable simulator 213, the value of attenuation of which is controlled by simulator drive circuit 253. Illustratively, the cable 400 connects the node containing the fixed-gain, fixed-loss bidirectional amplifier 200 to another node or to the headend of the network.

The output port 214 of the line balancer 210 is connected to the input port 221 of the fixed-gain bidirectional amplifier 220. Outbound signals are connected to the band splitting filter 222 and pass through the high pass filter 231 to the rf amplifier 230. The output of the rf amplifier 230 is connected to directional coupler 229. The low loss output of the directional coupler 229 is connected to the high pass filter 228 of band splitting filter 226 and then to the output port 227. The high loss output of directional coupler 229 is connected to the output connector 232 and to the input connector 251 of the AGC circuit 250.

A closed loop circuit is formed by the variable cable simulator 213, output connector 214, input connector 221, high pass filter 231, rf amplifier 230, directional coupler 229, output connector 232, input connector 251, rf receiver 252, simulator drive circuit 253, output connector 254 and input connector 215. The rf receiver 252 is tuned to the frequency of the rf signal being generated by the outbound pilot signal generator 311 of FIG. 3 and produces a DC voltage proportional to the energy contained at the pilot frequency. The simulator drive circuit 253 compares the DC signal received from the RF receiver with an internal preset reference and provides a control voltage to the variable cable simulator circuit 213 in such a manner that the RF signal power at the output of the RF amplifier 230 tends to be held constant within the error and accuracy of the closed loop system.

Inbound signals connected to output port 227 of the fixed gain amplifier 220 pass through the low pass filter 225 of output band splitting filter 226 and then through amplifier 224 to the low pass filter 223 of input band splitting filter 222 to connector 221. Then these inbound signals pass through connector 214 of line balancer 210 and are attenuated by variable cable simulator 213 and equalizer 212 and then are connected to connector 211 and cable 400 via which they proceed inbound towards the headend.

The fixed-gain, fixed-loss amplification system is now explained in greater detail. Illustratively, the fixed-gain, fixed-loss amplification system operates to insure that the signal strength (in both the inbound and outbound directions) at the connector 401 of the cable 400 is the same as the signal strength at the port 227 of bidirectional amplifier 220. To this end, the equalizer circuit 212 is a conventional circuit which equalizes the loss of a fixed amount of cable. More particularly, the equalizer provides a predetermined loss which enables the combined loss of fixed amount of cable and the loss of the cable equalizer to equal a fixed amount of flat attenuation across the entire frequency band (inbound and outbound) of the network.

The variable cable simulator provides variable amount of loss for simulating a variable amount of coaxial cable. Thus, the loss of the real cable 400 plus the loss of the cable simulated by the simulator circuit 213 is equivalent to the loss of a fixed amount of cable which is equalized by the cable equalizer circuit 212 to provide a fixed amount of attenuation across the entire frequency band of the network. Depending on the length and temperature of the actual cable 400 the amount of simulated cable provided by simulator 213 may vary, illustratively under the control of the simulator drive circuit 250. Typically, the fixed attenuation across the entire frequency band provided by the cable 400, the simulator 213, and the equalizer 212 is equal in size to the gain of the fixed gain bidirectional amplifier 220. Thus, the signal strength at point 401 is the same as the signal strength at point 227 in FIG. 4.

The automatic gain control circuit 250 serves to adjust the cable simulator circuit to simulate the appropriate amount of cable. This is accomplished as follows. The signal strength of the outbound pilot signal (generated by the pilot signal generator 311 of FIG. 3) is detected by the rf receiver 252 after amplification by the amplifier 230. The rf receiver 252 generates a DC signal proportional to the strength of the pilot signal. This DC signal is in turn compared to a preset reference by the simulator drive circuit 250 which provides a control voltage to adjust the cable simulator circuit 213 to maintain the pilot signal strength at a particular level. Thus, the automatic gain control system may be used to adjust the simulator 213 depending on the length of the cable 400.

If the temperature increases, then the attenuation of the cable 400 increases. (This is the same as if the cable 400 became longer). Accordingly, the cable simulator circuit 213 is adjusted by the simulator drive circuit 253 to simulate less cable so the sum of the attenuation provided by the cable 400, the simulator 213, and the equalizer 212 remains fixed at a constant level across the entire inbound and outbound frequency band.

Figure 5:
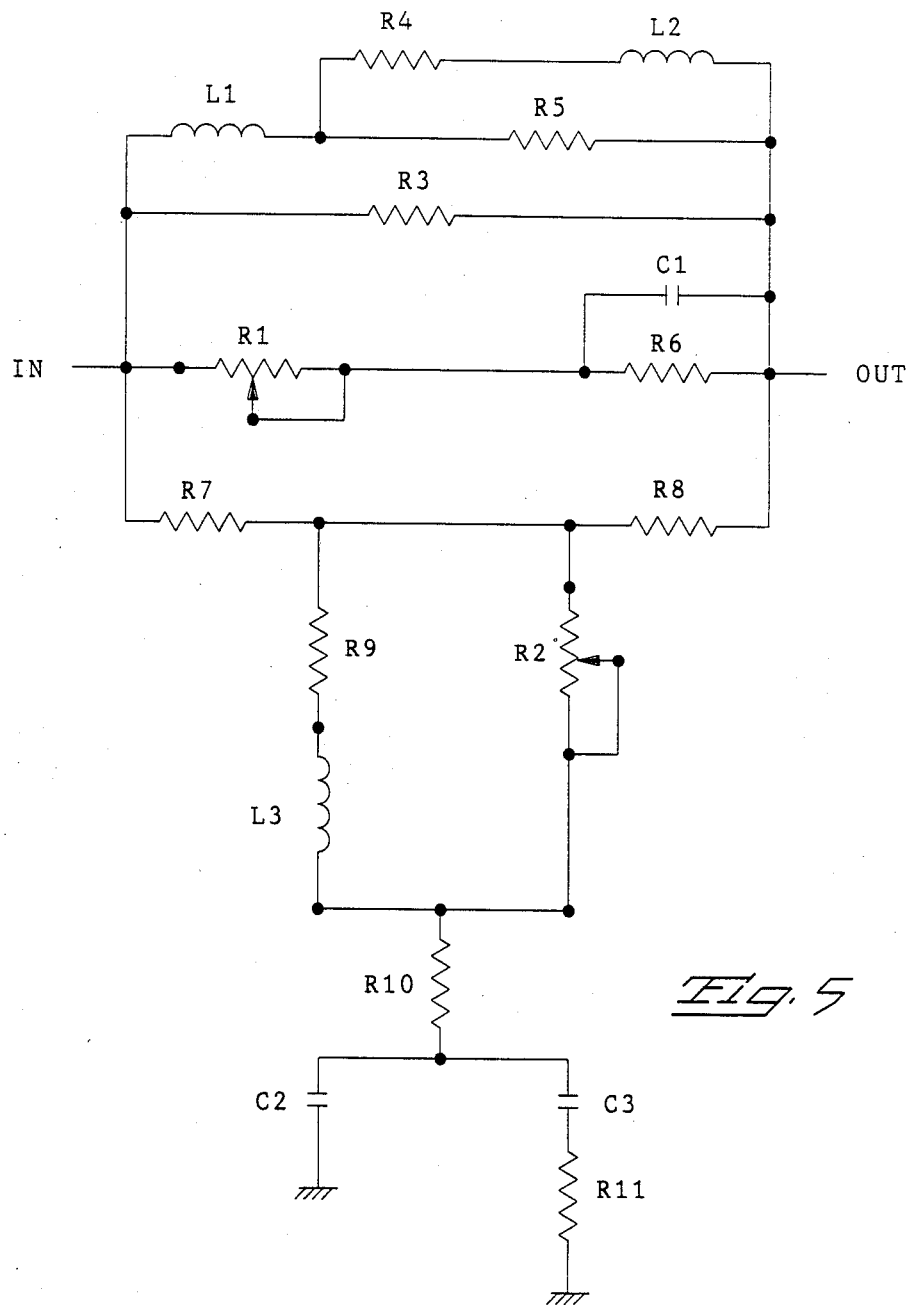
FIG. 5 schematically illustrates a variable cable simulator for use in the fixed-gain, fixed-loss bidirectional amplifier with AGC of FIG. 4.

Illustratively, the variable cable simulator is a variable bridge-tee circuit as shown in FIG. 5. R7 and R8 are the tee resistors. R1 and R2 form a ganged variable resistor pair that combined provide proper resistance so that the input and output driving point impedances are fixed at, for example, 75 ohms at any setting of the ganged resistor pair. C1 and R6 in conjunction with R9 and L3 limit the range of the potentionmeter formed by R1 and R2. R3 and R10 in conjunction also limit the range of the potentionmeter formed by R1 and R2. R5, L1, C2 and R11 provides proper high frequency (above 150 MHz) responses for the simulator. R4, L2 and C3 provide proper operation at lower frequencies (5 to 150 MHz). Illustratively, to achieve automatic gain control the potentionmeter formed by the resistor R1 and R2 operates under the control of the simulator drive circuit 253 of the automatic gain control circuit 250.

Both the fixed cable equalizer 212 and the variable cable simulator 213 of the line balancer 214 operate over the entire frequency band of the outbound and inbound signal paths. This line balancer concept provides a means of enabling a fixed loss between amplifiers in a system over the entire frequency band of interest, which in turn allows for a simple fixed-gain, no adjustment, bidirectional amplifier module 220 to be used. Further, this line balancer concept allows simultaneous adjustment of inbound and outbound signal path losses by simply monitoring a signal in the outbound signal path and adjusting the variable cable simulator to provide for proper path loss in the outbound direction.

Since both inbound and outbound path losses are properly adjusted via the fixed cable equalizer and variable cable simulator there is no need to monitor path loss in the inbound direction and make independent adjustments on outbound and inbound signal paths separately. Thus, the fixed-gain, fixed-loss approach to bidirectional broadband amplification allows system simplicity of design, installation and use by providing for control of both outbound and inbound signal paths simultaneously by selecting the proper line balancer and making only one adjustment to the system, that is, adjusting the variable cable simulator to provide proper path loss while monitoring a outbound signal.

The present invention expands upon this basic fixed-gain, fixed-loss amplification concept to include the pilot generator with an outbound RF signal that is monitored by a closed loop AGC system in the outbound path. This closed loop AGC system is used to control the attenuation of the variable cable simulator in the line balancer, thus providing a system that not only automatically provides AGC in both outbound and inbound signal paths simultaneously, but also eliminates the need of any adjustable components in the bidirectional amplifiers.

Since the predominant temperature caused variation in path loss is due to coaxial cable loss changes, these temperature caused variations can be compensated for by changing the adjustment of the variable cable simulator in the line balancer similar to the manner in which the line balancer allows for different lengths of cable to be placed between amplifiers in the system.

The present invention is easier to design than the prior art CATV LAN AGC systems because no inbound pilot signal generators are used, no inbound pilot signal traps are required, and all amplifiers in the system are of the same type. That is, there is no need to specify different types of inbound RF receiver AGC circuits because there are none in the present invention.

The present invention is easier to install than the prior art CATV LAN AGC systems because there are no adjustments, all equipment is identical, and there is less equipment to install.

The present invention is easier to maintain and use because the types of equipment needed to be used as spares is less than in the conventional CATV LAN and also because the equipment is easier to maintain because there are no adjustments required in the system because the closed loop AGC system automatically corrects for not only different cable losses due to design differences between amplifier-to-amplifier cable lengths, but also corrects for temperature caused variations in cable loss changes.

Finally, the above-described embodiments of the invention are intended to be illustrative only. Numerous alternative embodiments ma be devised by those skilled in the art without departing from the spirit and scope of the invention as set forth in the following claims.

I claim:

1. A device for balancing losses in a coaxial transmission path of a bidirectional network having an inbound and outbound frequency band comprising:
   a line balancer circuit including an equalizer circuit for equalizing the loss of a fixed amount of coaxial cable, and simulator circuit means for providing a variable amount of loss for simulating a variable amount of coaxial cable,
   a bidirectional amplifier having a fixed gain across said inbound and outbound frequency bands and connected to said line balancer circuit, and
   feedback means connected between said amplifier and said simulator circuit means for monitoring the strength of a pilot signal transmitted via said coaxial transmission path of said network and for adjusting said simulator circuit means in response thereto, said feedback means adjusting said simulator circuit means so that the sum of the losses provided by the coaxial transmission path, the equalizer circuit and the simulator circuit means are equal in magnitude to the fixed gain of the bidirectional amplifier across the inbound and outbound frequency bands of the network.

2. The device of claim 1 wherein said feedback means comprises an rf receiver connected to said amplifier for detecting the strength of said pilot signal and a drive circuit connected to said receiver and said simulator circuit means for adjusting said circuit means in response to the output of said receiver.

3. The device of claim 1 wherein said bidirectional amplifier includes an outgoing path comprising a first high pass filter, an amplifying element and a second high pass filter, and an incoming path comprising a first low pass filter, an amplifying element, and a second low pass filter, said feedback means being connected by way of a splitter to the output of the amplifying element in the outgoing path.

4. The device of claim 1 wherein said feedback means adjusts said simulator circuit means when the loss provided by said coaxial transmission path changes in response to temperature changes.

5. A local area network comprising
a headend including means for generating an outbound pilot signal,
a plurality of nodes,
a plurality of coaxial cable paths for transmitting said pilot signal from said headend to said nodes,
each said node comprising a line balancer circuit including an equalizer circuit for equalizing a fixed amount of coaxial cable loss and an adjustable circuit for simulating the loss of a variable amount of coaxial cable, a fixed gain bidirectional amplifier connected to said line balancer circuit, detector means connected to the amplifier for detecting the strength of the pilot signal, and means connected to said line balancer circuit for adjusting said adjustable circuit in response to the strength of the pilot signal as detected by said detector means so that the sum of the losses provided by a coaxial transmission path leading to the node, said equalizer circuit and said adjustable circuit equals in magnitude the gain of said amplifier.

6. A device for balancing losses in a coaxial transmission path of a network capable of transmitting signals in an inbound and outbound direction in an inbound and outbound bandwidth, respectively, said device comprising:

a coaxial cable equalizer circuit,
a cable simulator circuit in electrical communication with said equalizer circuit for simulating the loss of a variable amount of coaxial cable, and
control means associated with the simulator circuit for detecting the signal strength of an outbound pilot signal transmitted via said coaxial transmission path and for automatically adjusting the cable simulator circuit so that the combined loss of the transmission path, the cable simulator circuit and the cable equalizer circuit provides a predetermined fixed loss across the entire inbound and outbound bandwidth of the network.

7. The device of claim 6 wherein said device further comprises a bidirectional amplifier connected to said simulator circuit and said control means and having a fixed gain across said inbound and outbound bandwidth, said predetermined fixed loss being equal in magnitude to the gain of the bidirectional amplifier.

8. The device of claim 6 wherein said control means adjusts said simulator circuit in response to temperature changes of said coaxial transmission path.

9. A method for automatically balancing losses in a coaxial transmission path of a network comprising the steps of:

generating a pilot signal at a headend of said network and transmitting said pilot signal in an outgoing direction to a plurality of nodes,
at each node, transmitting said pilot signal through a line balancer circuit including an equalizer circuit for equalizing a fixed amount of coaxial cable loss and an adjustable circuit for simulating the loss of a variable amount of coaxial cable, amplifying said pilot signal in a fixed gain amplifier connected to said line balancer circuit, detecting the strength of said pilot signal after amplification by said amplifier, and adjusting said adjustable circuit in response to the detected strength of the pilot signal so that the sum of the losses in a coaxial transmission path leading to the node, said equalizer circuit and said adjustable circuit is at a predetermined fixed level across the entire bandwidth of the network.

10. The method of claim 9 wherein the amount of loss provided by said adjustable circuit is changed in response to changes in the temperature of said coaxial transmission path.

11. The method of claim 9 wherein said amplifier is a bidirectional fixed gain amplifier.

* * * * *